United States Patent [19]

Stillman

[11] Patent Number: 4,793,935
[45] Date of Patent: Dec. 27, 1988

[54] METHOD OF REMOVING CYANURIC ACID FROM BATHER WATER

[75] Inventor: Neil W. Stillman, Mesa, Ariz.

[73] Assignee: Applied Biochemists, Inc., Mequon, Wis.

[21] Appl. No.: 49,996

[22] Filed: May 15, 1987

[51] Int. Cl.$^4$ ............................................... C02F 1/54
[52] U.S. Cl. ................................... 210/729; 210/727; 210/755; 210/764; 210/904
[58] Field of Search ............... 210/725, 727, 728, 729, 210/735, 755, 764, 908, 904

[56] References Cited

U.S. PATENT DOCUMENTS 2,580,808  1/1952  Marks et al. .................. 210/755
3,145,206  8/1964  Fuchs et al. .................. 210/764
3,342,674  9/1967  Kowalski ...................... 210/755

FOREIGN PATENT DOCUMENTS 55-99380  7/1980  Japan ........................... 210/729

Primary Examiner—Peter Hruskoci
Attorney, Agent, or Firm—Andrus, Sceales, Starke & Sawall

[57] ABSTRACT

A method removing cyanuric acid from bather water in swimming pools, spas, and the like. Melamine is added to the bather water in a quantity sufficient to react with the cyanuric acid and form a precipitate. The insoluble precipitate can then be vacuumed or removed through the filtration system of the pool.

5 Claims, No Drawings

METHOD OF REMOVING CYANURIC ACID FROM BATHER WATER

BACKGROUND OF THE INVENTION

Halogens, such as, chlorine and bromine compounds, are generally used to sanitize bather water in swimming pools, spas and the like. The control is accomplished by maintaining a concentration of the halogen in the amount of 0.5 to 3.0 ppm. However, it has been found that the halogens are extremely susceptible to degradation by ultraviolet rays of the sun, with the result that the residual concentration of the halogen is quickly depleted.

To reduce the consumption of the halogen, it has been proposed to add a small quantity of cyanuric acid to the water. By using a concentration of cyanuric acid in the range of 30 to 60 ppm, the rate of of the chlorine or bromine loss can be reduced by as much as 60% to 70%.

More recently, stabilized halogens have been utilized for sanitizing bather water, in which the chlorine or bromine is reacted with amino based compounds. As a result, stabilized chlorine compounds, such as trichloro-s-triazine-trione or sodium-dichloro-s-triazine-trione have seen wide use for sanitizing bather water.

As a consequence of the repetitive use of using the stabilized chlorine compounds for sanitizing bather water, the concentration of the cyanuric acid keeps increasing and can exceed the recommended maximum level of 150 ppm of cyanuric acid.

Until now, the only feasible manner of reducing the concentration of cyanuric acid, once it has increased to an unacceptable level, has been to drain all or a portion of the water of the pool or spa and to refill with fresh water. This process is time consuming and costly, and in some areas of the country, during periods of low water reserve, the filling of pools is not permitted.

SUMMARY OF THE INVENTION

The invention relates to a simple and effective method of removing cyanuric acid from bather water in swimming pools, spas, or the like. In accordance with the invention, melamine is added to the bather water and reacts with the cyanuric acid to form an insoluble salt. The insoluble precipitate can then be either vacuumed from the pool or removed through the filtration system of the pool.

It has also been found that the coagulation or enlargement of the particle size of the precipitate can be enhanced by the addition of an organic flocking agent, such as polyacrylic acid or an inorganic flocking agent of the alum family.

Through use of the method of the invention, the concentration of cyanuric acid can be maintained within acceptable limits without the necessity of draining the pool or spa and refilling with fresh water.

Other objects and advantages will appear in course of the following description.

DESCRIPTION OF THE PREFERRED EMBODIMENT

Stabilized halogen compounds are widely used for sanitizing bather water in swimming pool spas, hot tubs, or the like. The stabilized halogen compounds are formed by reacting chlorine or bromine gas with amino based compounds and have the advantage of substantially reducing the consumption of the halogen in the bather water. The stabilized halogen compound may take the form of trichloro-s-triazine-trione or sodium dichloro-s-triazine-trione. However, it has been found that with the repetitive use of the stabilized halogen compounds, the concentration of cyanuric acid will continue to increase until it reaches levels above 150 ppm, which have been determined to be the maximum permissible concentration.

In accordance with the invention, melamine is added to the bather water and reacts with the cyanuric acid to form an insoluble salt precipitate. The melamine is preferably dissolved in water and added as a solution to the bather water.

It has been found that the melamine reacts with the cyanuric acid in a molar ratio of 1:1. The amount of melamine added to the bather water is not critical, and by calculation, a sufficient quantity of melamine can be added to react with all of the cyanuric acid in the water, or alternately, a lesser quantity of melamine can be added, which will reduce the cyanuric acid concentration below the maximum permissible concentration and provide an acceptable condition.

In general, it will require 1 lb. of melamine per 10,000 gallons of water to reduce the cyanuric acid concentration by 1 lb. or 12 ppm.

The reaction of melamine and cyanuric acid proceeds over a wide temperature range, and the preferred range is from 60° F. to 90° F.

The resulting precipitate can be removed from the bather water by vacuuming from the pool, or alternately, removed through the filtration system of the pool or spa.

The particle size of the precipitate can be increased by the addition of a flocking agent in an amount of 2 ppm to 4 ppm. Organic flocking agents, such as polyacrylic acid or polyacrylate can be employed, or alternately, in inorganic flocking agent, such as aluminum sulfate can be used.

The following analytical tests show the removal of cyanuric acid from water through the addition of melamine.

| Cyanuric Acid (mg/L) | Melamine Added (mg/L) | Residual Cyanuric acid (mg/L) | % Cyanuric Acid Removed |
|---|---|---|---|
| 100 | 100 | <10 | >90% |
| 200 | 200 | <10 | >95% |
| 300 | 300 | <10 | >96% |
| 400 | 400 | <10 | >97% |
| 500 | 500 | <10 | >98% |
| 200 | 100 | 100 | 50 |
| 300 | 200 | 100 | 67 |
| 400 | 300 | 100 | 75 |
| 500 | 400 | 100 | 80 |

In all cases, the addition of melamine to the cyanuric acid solution produced a white precipitate and the turbid solution was filtered through No. 41 Whatman filter paper and the filtrate was analyzed for cyanuric acid on the Spectronic 21 at 250 nm verus deionized water.

The invention provides a simple, yet effective, method of reducing the concentration of cyanuric acid in sanitized pools, spas, hot tubs, and the like.

Various modes of carrying out the invention are contemplated as being within the scope of the following claims particularly pointing out and distinctly claiming the subject matter which is regarded as the invention.

I claim:

1. A method of sanitizing a body of bather water, comprising the steps of intermittently adding to the body a cyanuric acid derivative containing a stabilized halogen, said halogen being released in said body to sanitize the same and produce a progressively increased concentration of residual cyanuric acid in said body, admixing an effective amount of melamine with said body of water to reduce said concentration of residual cyanuric acid to an acceptable limit of less than a maximum level of about 150 ppm by reacting said melamine with said residual cyanuric acid and forming an insoluble precipitate, removing the precipitate from said body, and adding additional quantities of said cyanuric acid derivative to said body, after the removal of said precipitate, to sanitize said body.

2. The method of claim 1, and including the step of agitating said body of water after adding said melamine.

3. The method of claim 1, wherein the step of removing the precipitate comprises filtering the precipitate from the body of water.

4. The method of claim 1, wherein the step of admixing melamine is carried out with the body of water at a temperature of 60° to 90° F.

5. The method of claim 1, wherein said halogen is chlorine.

* * * * *